United States Patent Office 3,466,281
Patented Sept. 9, 1969

3,466,281
AS-TRIAZINO[5,6-b]INDOLES
Jan Mieczyslaw Zygmunt Gladych, Hertford, and John Harold Hunt, Theydon Bois, England, assignors to Allen and Hanburys Limited, London, England
No Drawing. Continuation-in-part of application Ser. No. 658,644, Aug. 7, 1967. This application July 16, 1968, Ser. No. 745,124
Claims priority, application Great Britain, Sept. 17, 1963, 36,551/63; Feb. 20, 1964, 7,168/64; Aug. 27, 1964, 35,190/64; July 18, 1967, 33,050/67
Int. Cl. C07d 57/34; A61k 9/04
U.S. Cl. 260—249.9      10 Claims

ABSTRACT OF THE DISCLOSURE

As-triazino[5,6-b]indoles of the formula:

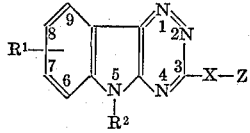

where $R^1$ is halogen, such as chloro, bromo or fluoro; lower alkyl of 1–4 carbon atoms, hydroxy, mercapto, lower alkoxy of 1–4 carbon atoms, lower alkylmercapto of 1–4 carbon atoms, nitro, amino, lower alkylamino of 1–4 carbon atoms, diloweralkylamino of 2–8 carbon atoms, or trifluoromethyl; $R^2$ is hydrogen, lower alkyl of 1–4 carbon atoms, benzyl, or phenethyl; X is $NR^3$, where $R^3$ is hydrogen, methyl, or lower alkanoyl of 1–4 carbon atoms; and Z is AlkOH, where Alk is branched or straight chain alkylene of 2–10 carbon atoms; the alkylene chain may also be substituted with an aryl group such as phenyl or an additional hydroxy group, exhibit antiviral activity. Particularly valuable compounds are those substituted in the 3-position with hydroxyalkylamino moiety.

---

This application is a continuation-in-part of Ser. No. 658,644, filed Aug. 7, 1967, which is a continuation-in-part of Ser. No. 396,727, filed Sept. 15, 1964, now abandoned.

The present invention is concerned with novel heterocyclic compounds. These compounds exhibit antiviral activity. More particularly, the present invention provides as-triazino[5,6-b]indoles of the general formula:

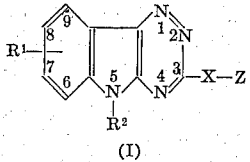

where $R^1$ is halogen, such as chloro, bromo or fluoro; lower alkyl of 1–4 carbon atoms, hydroxy, mercapto, lower alkoxy of 1–4 carbon atoms, lower alkylmercapto of 1–4 carbon atoms, nitro, amino, lower alkylamino of 1–4 carbon atoms, dilower-alkylamino of 2–8 carbon atoms, or trifluoromethyl; $R^2$ is hydrogen, lower alkyl of 1–4 carbon atoms, benzyl, or phenethyl; X is $NR^3$, where $R^3$ is hydrogen, methyl, or lower alkanoyl of 1–4 carbon atoms; and Z is AlkOH, where Alk is branched or straight chain alkylene of 2–10 carbon atoms. The alkylene chain may also be substituted with an aryl group such as phenyl or an additional hydroxy group.

The invention also comprises N-oxide derivatives and the conventional pharmaceutically acceptable acid addition salts of the compound of Formula I, including, for example, the hydrochloride, sulfate, nitrate, citrate, maleate, fumarate, acetate, and benzoate.

The compounds of Formula I are prepared by the cyclization of an isatin β-thiosemicarbazone of the formula

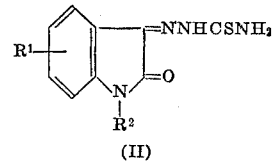

wherein $R^1$ and $R^2$ have the meanings given above, to give 3-mercapto-as-triazino[5,6-b]indoles of the general formula

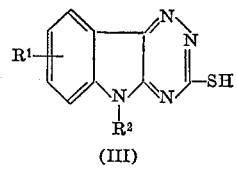

and then converting the compounds of Formula III to compounds of Formula I by conventional methods.

The thiosemicarbazones of Formula II may be cyclized to give the compounds of Formula III by, for example, refluxing in the presence of ammonia or aqueous potassium carbonate. Alternatively, the thiosemicarbazones need not be isolated, in which case thiosemicarbazide and the isatin of formula

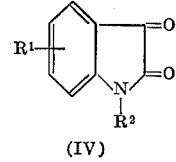

are refluxed together in aqueous potassium carbonate solution.

The 3-mercapto compound of Formula III is then reacted with an aminating agent such as a hydroxyalkylamine, preferably by refluxing in an inert solvent such as butanol or in an excess of the reacting amine. Alternatively, if the amine is a low boiling amine, an alcoholic solution of it may be heated in a sealed tube with the compounds of Formula III. The latter, in the solid state, are principally in the 3-thione (C=S) form.

Still further, the products may be prepared by converting the 3-mercapto compound to a 3-methylmercapto compound by alkylating by conventional methods, and then treating the methylmercapto compound with the aminating agent.

As indicated above, compounds with a given $R^1$ group are obtained by utilizing as a starting material an isatin compound with the corresponding $R^1$ group. Certain compounds, however, are obtained by chemical conversion of one $R^1$ group to another. For example, a compound in which $R^1$ is hydroxy or mercapto is prepared by cleavage of the corresponding alkoxy or methylmercapto compound, respectively, with 48% HBr. A compound in which $R^1$ is amino, alkylamino, or dialkylamino is prepared by reacting the corresponding bromo compound with ammonia, an alkylamine, or a dialkylamine. An 8-nitro compound may be prepared by nitrating a 3-chlorotriazinoindole with nitric and sulfuric acids and then aminating at the 3-position.

Lower alkanoyl and benzoate esters of compounds in which $R^1$ is hydroxy are also part of the present invention. They are prepared by treating the hydroxy compound with a lower alkanoyl or benzoyl halide or anhydride according to conventional procedures for preparing phenol esters. The acetate is preferred.

3

If desired, the basic compounds of Formula I obtained by any of the processes given above may be quaternized or converted into their salts with inorganic or organic acids and the acidic compounds of Formula I may be converted into their salts with bases.

For the purpose of further illustration of this invention, the following examples are set forth in detail below.

EXAMPLE 1

3-mercapto-5-methyl-as-triazino[5,6-b]indole (a) 6.0 g. of N-methylisatin thiosemicarbazone was suspended in 1.5 l. of water containing 15 ml. of ammonia solution (Sp.Gr. 0.880) and the mixture was boiled under reflux for 24 hours. After cooling, a small amount of insoluble material was removed by filtration and discarded. The filtrate was evaporated under reduced pressure to about one third of its volume and, after cooling, the yellow solid which separated was filtered and recrystallized from 50% aqueous dimethylformamide; 3-mercapto-5-methyl - as - triazino[5,6-b]-indole was obtained, M.P. 279°–281° C.

The following compounds were prepared in a similar manner:

3-mercapto-as-triazino[5,6-b]indole, M.P. higher than 360° C.
3-mercapto-5-ethyl-as-triazino[5,6-b]indole, M.P. 294° C.
3-mercapto-5-propyl-as-triazino[5,6-b]indole, M.P. 278°C.

(b) 5 g. of N-methylisatin thiosemicarbazone was suspended in 100 ml. of water containing 4.4 g. of potassium carbonate and the mixture was boiled under reflux for 75 minutes. The orange colored solution was cooled, diluted with 100 ml. of water and acidified with acetic acid. The yellow solid which separated was filtered, washed with water, dried at 100° C. and recrystallized from a large volume of methanol to give 3-mercapto-5-methyl-as-triazino[5,6-b]indole, M.P. 278° to 282°.

The following compounds were prepared in a similar manner:

3-mercapto-as-triazino[5,6-b]indole, M.P. higher than 360° C.
3-mercapto-5-methyl-8-chloro-as-triazino[5,6-b]indole, M.P. 315° to 316°.
3-mercapto-8-nitro-as-triazino[5,6-b]indole, M.P. higher than 350°.
3-mercapto-8-methoxy-as-triazino[5,6-b]indole, M.P. 331° C.
3-mercapto-5-methyl-8-bromo-as-triazino[5,6-b]indole, M.P. higher than 350° C.
3-mercapto-5-methyl-8-nitro-as-triazino[5,6-b]indole, M.P. 283° C.

(c) 16 g. of N-methylisatin, 10 g. of thiosemicarbazide and 21 g. of potassium carbonate were boiled under reflux in 500 ml. of water for 7 hours. A small amount on insoluble material was removed by filtration and discarded and the filtrate was cooled and acidified with acetic acid. The solid which separated was filtered, washed with water and dried at 100° C. to give 3-mercapto-5-methyl-as-triazino[5,6-b] indole, M.P. 275°–281° C.

The following compounds were prepared in a similar manner:

3-mercapto-7-methoxy-as-triazino[5,6-b]indole, M.P. 309° C.
3-mercapto-5-propyl-8-chloro-as-triazino[5,6-b]indole, M.P. 270°–275° C.

EXAMPLE 2

3-methylmercapto-5-propyl-as-triazino[5,6-b]indole 3 g. of 3-mercapto-5-propyl-as-triazino[5,6-b]indole was dissolved in 25 ml. 1 N sodium hydroxide. 1.4 ml. of dimethylsulfate was added in several portions while shaking during 10 minutes. The mixture was allowed to stand for 1½ hours and was then poured into 250 ml. of water.

4

The yellow solid was filtered and recrystallized from ethanol, after discarding a small amount of insoluble material. The product had M.P. 129°–130°.

The following compounds were prepared in a similar manner:

3-methylmercapto-as-triazino[5,6-b]indole, M.P. 314° C.
3-methylmercapto-5-methyl-as-triazino[5,6-b]indole, M.P. 185° C.
3-methylmercapto-5-methyl-8-chloro-as-triazino[5,6-b]indole, M.P. 237° C.
3-methylmercapto-5-methyl-8-nitro-as-triazino[5,6-b]indole, M.P. 251° C.
3-methylmercapto-5-propyl-8-chloro-as-triazino[5,6-b]indole, M.P. 187° C.

EXAMPLE 3

3-(3-hydroxypropylamino)-5-methyl-as-triazino-[5,6-b]indole

A solution of 2 g. of 3-mercapto-5-methyl-as-triazino-[5,6-b]indole and 20 ml. of 3-aminopropanol was refluxed for 1.5 hours, hydrogen sulphide being evolved. On cooling, the solution was poured into water and the precipitated solid was removed by filtration, washed with water and dried. Recrystallization from ethanol gave 3-(3-hydroxypropylamino) - 5-methyl-as-triazino[5,6-b]indole as yellow needles, M.P. 164°–165° C.

The hydrochloride crystallized from ethanol to yellow needles, M.P. 214°–215° C.

The following compounds were prepared in a similar manner:

3-(2-hydroxyethylamino)-as-triazino[5,6-b]indole, M.P. 270° to 271° C.
3-(3-hydroxypropylamino)-as-triazino[5,6-b]indole, M.P. 248° to 249° C.
8-chloro-3-(2-hydroxyethylamino)-5-methyl - as - triazino[5,6-b]-indole, M.P. 262° to 263° C.
8 - chloro-3-(3-hydroxypropylamino)-5-methyl-as-triazino[5,6-b]-indole, M.P. 203° to 204° C.

EXAMPLE 4

3-(3-hydroxy-3-methylbutylamino)-5-methyl-8-trifluoromethyl-as-triazino[5,6-b]indole To a stirred 500 cc. three-neck flask were added the following: 9.0 g. (0.054 m.) of chloral hydrate in 60 ml. water, 120 g. of crystalline sodium sulfate, 8.76 g. (0.05 m.) of p-trifluoromethyl-N-methylaniline (prepared by treating p-trifluoromethyl bromobenzene with 5 equivalents of methylamine in a stainless steel bomb at 110° for 8 hours) dissolved in 30 ml. of water containing 4.2 cc. of conc. HCl, and finally a solution of 11.0 g. (0.158 m.) hydroxylamine.HCl in 50 ml. of water. The contents were heated to reflux with a heating mantle and refluxed while stirring for 4 minutes. The aqueous mixture was cooled and extracted with chloroform. After drying and concentration of the organic layer, 5.5 g. (41.5% yield) of an off-white solid product was obtained. It was immediately cyclized to the isatin without further purification.

A mixture of 5.5 g. (0.022 m.) of p-trifluoromethyl-N-methylisonitrosoacetanilide and 25 cc. of conc. $H_2SO_4$ was heated on the steam bath for 10 minutes and poured on crushed ice. The orange solid was collected. It weighed 3.8 g. (75.5% yield). After purification from ethyl acetate-petroleum ether, the orange crystals of 5-trifluoromethyl-N- methylisatin melted at 131°–133° C.

A mixture of 3.8 g. (0.0165 m.) of 5-trifluoromethyl-N-methylisatin in 150 cc. of water containing 1.6 g. thiosemicarbazide and 4.6 g. $K_2CO_3$ was refluxed for 17 hours. The dark amber solution was filtered from any insolubles, cooled and acidified with glacial acetic acid. The precipitated yellow solid was collected and dried. It weighed 4.0 g. giving an 85% crude yield. It was purified from mixture of methanol-dimethylformamide giving a M.P. of 274°–276° C.

A mixture of 2.8 g. (0.01 m.) of the above 3-mercapto-5-methyl-8-trifluoromethyl-as-triazino[5,6-b]indole in 16 cc. of 4-amino-2-methyl-2-butanol was heated in an oil bath at 185°–190° C. for 3 hours. The contents were poured into cold water and the tan product collected. It was recrystallized from charcoaled acetonitrile to give 2.2 g. of yellow crystals melting at 210°–211° C. Purified yield of 63% was obtained.

EXAMPLE 5

3-(3-hydroxy-3-methylbutylamino)-5-methyl-8-fluoro-as-triazino-[5,6-b]indole

A stirred mixture of 5.8 g. (.0324 m.) of 1-methyl-5-fluoroisatin, 3.25 g. (.0358 m.) of thiosemicarbazide, 5.6 g. of anhydrous potassium carbonate, and 650 ml. of water was heated under reflux for 5 hours, cooled, filtered, and the filtrate was acidified with glacial acetic acid. The precipitated yellow solid was filtered off, washed with water, and dried. Yield, 7.6 g. (quant.); M.P. 300–305° (dec.).

An analytical sample of the 3-mercapto-5-methyl-8-fluorotriazinoindole was recrystallized from aqueous dimethylformamide, M.P. 308–310° (dec.).

To a stirred, cooled (0–5°) solution of 1.17 g. (.005 m.) of the above 3-mercapto-5-methyl-8-fluoro-as-triazino[5,6-b]indole in 15 ml. of 1 N sodium hydroxide was added in one portion 0.4 ml. (0.91 g., 0.0064 m.) of methyl iodide. After 1–2 minutes a solid began to form. The cooling bath was removed, and the reaction mixture was stirred for 2.5 hr. The yellow solid was filtered off, washed with water, and dried. Yield 1.15 g. (93%), M.P. 208–212°. An analytical sample of the 3-methylthio compound was recrystallized first from aqueous acetic acid and then from acetonitrile, M.P. 214–215°.

A stirred mixture of 1.24 g. (0.005 m.) of the above 3 - methylthio-5-methyl-8-fluoro-as-triazino[5,6 - b]indole and 1.5 ml. of 4-amino-2-methyl-2-butanol was heated in an oil bath at 170–180° (bath temperature) for 5 hours. The cooled reaction mixture was treated with water, and the dark brown solid was collected by suction filtration. The crude title product was recrystallized from ethanol, using "Norit A" decolorizing carbon to give 1.0 g. (66%) of tan, crystalline solid, M.P. 223–224°.

EXAMPLE 6

3-(3-hydroxy-3-methylbutylamino)-5-methyl-8-butyl-as-triazino-[5,6-b]indole

To a stirred solution of 4.06 g. (.02 m.) of 5-butylisatin in 60 ml. of methanol was added in small portions 20 ml. of 10% methanolic potassium hydroxide followed by 3.0 ml. of dimethyl sulfate in one portion. The temperature rose to 35°. Stirring was continued for 50 min., the solid potassium methyl sulfate was removed by filtration, and the solvent was evaporated from the filtrate under reduced pressure. The residual red syrup was treated with 100 ml. of 3 N HCl, heated on a steam bath for 5 minutes, and the cooled mixture was extracted three times with ether totaling 300 ml. The combined extracts were dried over anhydrous magnesium sulfate, and the ether was evaporated to give 3.55 g. (83%) of 1-methyl-5-butylisatin as a red syrup, which was used without further purification.

A stirred mixture of 3.50 g. (.0161 m.) of the above 1-methyl-5-butylisatin, 1.62 g. (.0178 m.) of thiosemicarbazide, 2.8 g. of potassium carbonate, and 370 ml. of water was heated under reflux for 5 hr. The cooled reaction mixture was clarified by filtration through a filter aid, and the filtrate was acidified with glacial acetic acid. The precipitated yellow 3-mercapto-5-methyl-8-butyltriazinoindole was collected by suction filtration and purified by recrystallization from glacial acetic acid. Yield, 2.68 g. (61%); M.P. 242–244° (dec.).

An analytical sample was recrystallized from aqueous dimethylformamide, M.P. 243–245° (dec.).

To a stirred solution of 5.44 g. (.02 m.) of the above 3-mercapto-5-methyl-8-butyl - as - triazino[5,6-b]indole in 60 ml. of 1 N sodium hydroxide and 50 ml. of ethanol was added in one portion 1.6 ml. (3.62 g., .0255 m.) of methyl iodide. There was a mildly exothermic reaction, and a precipitate formed immediately. After stirring for 2 hr., the crude 3-methylthio product was collected by suction filtration, and purified by recrystallization from ethanol, using "Norit A" decolorizing carbon. Yield, 4.0 g. (70%), M.P. 138–139°.

A stirred mixture of 2.86 g. (.01 m.) of the above 3-methylthio-5-methyl-8-butyl-as-triazino[5,6-b]indole and 4.0 ml. of 4-amino-2-methyl-2-butanol under a blanket of nitrogen was heated in an oil bath to 170–190° (bath temp.) for 12 hr. The cooled reaction mixture was poured into 100 ml. of water, and the crude title product crystallized by cooling and scratching the sides of the flask. The crude product was collected by suction filtration, and was purified by recrystallization from acetonitrile using "Norit A" decolorizing carbon. Yield 2.2 g. (64.5%), M.P. 125–127°.

Alkylation of the 5-butylisatin with phenethyl bromide instead of dimethyl sulfate gives the 5-butyl-1-phenethylisatin which when carried through the above procedural steps gives the 5-phenethyltriazinoindole product.

EXAMPLE 7

3 - (3 - hydroxy - 3 - methylbutylamino) - 5,8 - dimethyl-as-triazino[5,6-b]indole 1,5-dimethylisatin (2.0 g.), 1.25 g. of thiosemicarbazide and 1.94 g. of potassium carbonate were refluxed in 400 ml. of water for 6 hrs. The clear yellow solution was acidified with glacial acetic acid and the yellow 3-mercapto-5,8-dimethyl - as - triazino[5,6 - b]indole collected; M.P. 299–301° C.

3-mercapto-5,8-dimethyl-as-triazino[5,6-b]indole (1.32 g.) and 15 ml. of 4-amino-2-methyl-2-butanol were heated to 185° C. for 4 hours. The clear yellow mixture was diluted with water and the yellow product isolated; M.P. 202–204° C.

EXAMPLE 8

3 - (3 - hydroxy - 3 - methylbutylamino) - 8 - methoxy-5-methyl-as-triazino[5,6-b]indole 5-methoxy-N-methylisatin (0.5 g.), 0.263 g. of thiosemicarbazide and 0.447 g. of potassium carbonate were suspended in 100 ml. of water and refluxed for 20 hrs. Upon acidifying the clear yellow-orange solution an orange solid precipitated (3-mercapto-5-methyl-8-methoxy-as-triazino[5,6-b]indole); M.P. 310–312° C.

Methyl iodide (2.9 ml.) was added to a cooled (ice bath solution of 8 g. of 3-mercapto-5-methyl-8-methoxy-as-triazino[5,6-b]indole in 120 ml. of 1 N NaOH. After 1 hour stirring at room temperature the green solid was isolated (3-methylmercapto-5-methyl-8-methoxy-as-triazino[5,6-b]indole); M.P. 164–167° C.

3 - methylmercapto - 5 - methyl - 8 - methoxy - as - triazino[5,6-b]indole (7.0 g.) was heated to 160° C. for 5 hours in 25 ml. of 4-amino-2-methyl-2-butanol. The unreacted alcohol was removed in vacuo and water added to the residue. The yellow product was recovered and recrystallized from benzene to give a purified product; M.P. 184–185.5° C.

Treatment of the product with an excess of acetic anhydride according to conventional acetylation procedure give 3-[N-(3-acetoxy-3-methylbutyl)acetamido)]-8-methoxy-5-methyl-as-triazino[5,6-b]indole. Mild basic hydrolysis of this compound gives 3-[N-(3-hydroxy-3-methylbutyl)acetamido] - 8 - methoxy - 5 - methyl - as-triazino[5,6-b]indole.

EXAMPLE 9

3 - (3 - hydroxy - 3 - methylbutylamino) - 5 - methyl - 8-butoxy-as-triazino[5,6-b]indole To a stirring mixture of 16.5 g. (0.1 m.) of p-butoxyaniline in 48 cc. benzene and 36 cc. water containing 3.75 g. NaOH was added dropwise 9.6 g. of acetic anhydride. Temperature was kept between 30°–35° C. with an ice bath. After addition the mixture was stirred at room temperature for 0.5 hr. The precipitated white crystalline solid was collected, washed with cold benzene and dried. The product p-butoxyacetanilide weighed 20.3 g. 98.8% yield). M.P. was 110°–112° C. It was used further without purification.

To a hot solution of 20.7 g. (0.1 m.) of p-butoxyacetanilide in 200 ml. of dry toluene was added portionwise 4.9 gm. of sodium amide over a 20 min. period. Evolution of $NH_3$ was noted. After a 2½ hr. reflux, the heat source was removed and 12.6 g. (0.1 m.) of dimethyl sulfate was added dropwise. Contents were refluxed again for 0.5 hr. and poured into 200 ml. of water. The organic layer was separated and dried over $MgSO_4$. After concentration in vacuo, 20.5 g. (~92%) of liquid residue of p-butoxy-N-methylacetanilide was obtained. This was immediately hydrolyzed as described below.

A solution of 20.5 g. (0.092 m.) of p-butoxy-N-methylacetanilide in 81 cc. of ethanol and 9 cc. of water containing 22.5 g. KOH was refluxed for 17 hours. Alcohol was removed in vacuo and the aqueous mixture extracted with benzene. The organic layer was dried and concentrated in vacuo leaving 13.3 g. of brown liquid residue. Distillation at 96°–102° C./0.2 mm. gave 11.3 g. (69% purified yield) of p-butoxy-N-methylaniline.

To a solution of 8.6 g. (0.043 m.) of p-butoxy-N-methylaniline in 32 ml. of dry benzene containing 3.5 g. of dry pyridine was added dropwise 6.72 g. (0.048 m.) of ethyl oxalyl chloride. The mixture was refluxed for 0.5 hours, the pyridine.HCl salt was removed by filtration and the clear filtrate was concentrated in vacuo to give 14.3 g. of crude yellow residue. The fraction boiling at 145°–150° C./~0.5 mm. was collected. It weighed 11.3 g., giving a 94% yield of p-butoxy-N-methyl-N-ethyloxalyl aniline, which was then cyclized to the isatin.

To a solution of 11.3 g. (0.04 m.) of the above in 46 ml. of carbon tetrachloride was added portionwise 8.37 g. (0.04 m.) of phosphorus pentachloride. Contents were stirred at room temperature for 45 minutes, the yellowish solution was concentrated in vacuo and the viscous residue was poured on crushed ice. The red oily product was extracted with chloroform and dried over $MgSO_4$. After concentration, 10 g. of red viscous 5-butoxy-N-methylisatin was obtained.

9. (0.038 m.) of 5-butoxy-N-methylisation and 3.8 g. of thiosemicarbazide in 250 cc. of water containing 11.8 g. $K_2CO_3$ were refluxed for 19 hours. The deep red solution was filtered from insolubles and acidified with glacial acetic acid. The precipitated orange solid was collected and dried. The 3-mercapto-5-methyl-8-butoxy-as-triazino[5,6-b]indole weighed 6.4 g. giving a 59% yield. After recrystallization from methanol-dimethylformamide, it gave a M.P. of 251.5°–253.5° C.

A mixture of 6.4 g. (0.023 m.) of 3-mercapto-5-methyl-8-butoxy-as-triazino[5,6-b]indole in 15 cc. of 4-amino-2-methyl-2-butanol was kept in a 190° C. temperature oil bath for 3 hours. It was poured into 200 cc. of water precipitating a yellow solid. The collected product weighed 3.05 g., giving a 38% yield. After recrystallization from acetonitrile the yellowish-green needles gave a M.P. of 140–142° C.

EXAMPLE 10

3-(3-hydroxy-3-methylbutylamino)-5-methyl-8-bromo-as-triazino[5,6-b]indole

To a stirred suspension of 2.3 g. (0.01 m.) of 5-bromoisatin in 25 ml. of methanol was added to 10 ml. of 10% methanolic KOH followed by 1.5 ml. of dimethyl sulfate. Stirring at room temperature was continued for 45 minutes. The white potassium methyl sulfate salt was removed by filtration and the clear red filtrate was concentrated in vacuo. The solid residue was triturated with aqueous alcohol and filtered off to give 1.65 g. (68.8% yield) of 5-bromo-N-methylisatin. After purification from ethanol the deep orange needles melted at 164°–166° C.

A mixture of 0.5 g. (0.002 m.) of 5-bromo-N-methylisatin, 0.2 g. (0.0022 m.) of thiosemicarbazide and 0.6 g. $K_2CO_3$ in 25 ml. of water was refluxed for 4½ hours. Complete solution resulted. The solution was filtered hot from any insolubles, cooled and acidified with glacial acetic acid; 0.55 g. of orange solid was obtained (93% crude yield). It was recrystallized from $CH_3CN$—MeOH mixture to give orange needles of 8-bromo-3-mercapto-5-methyl-as-triazino[5,6-b]indole, melting at 289°–291° C.

To a partial solution of 14.5 g. (0.049 m.) of 3-mercapto-5-methyl-8-bromo-as-triazino[5,6-b]indole in 140 ml. of 1 N NaOH was added 2.8 ml. of methyl iodide. The mixture was stirred at room temperature for 45 minutes. The yellow solid was collected. It weighed 11.8 g., giving a 78% yield. It was recrystallized from a large volume of ethanol to give fine yellow needles of the 3-methylmercapto compound, melting at 250°–252° C.

3-methylmercapto-5-methyl-8-bromo-as-triazino[5,6-b]indole (3.1 g., 0.01 m.) in 22 ml. of 4-amino-2-methyl-2-butanol was heated in a 135°–137° C. temperature oil bath for 21 hours. It was poured into cold water (250 ml.) and the precipitated mustard solid was collected. It weighed 3.5 g. giving 96% yield. It was recrystallized from charcoaled acetonitrile to give yellow needles of title product, melting at 195°–196° C. (75% yield).

EXAMPLE 11

3-(3-hydroxy-3-methylbutylamino)-5-methyl-8-amino-as-triazino[5,6-b]indole 3.0 g. (0.0083 moles) of the 8-bromo compound of Example 10 was reacted with liquid ammonia in the presence of a small amount of Cu+powdered CuCl in a closed vessel at 110° for 7–8 hr. The reaction product was passed through a dry column of basic alumina (the eluate, developed with $CHCl_3$—MeOH (95–5), was monitored with TLC). The clean crop was recrystallized with acetonitrile to give 1.05 g. product.

Use of methylamine, ethylamine, propylamine, butylamine, dimethylamine, or dipropylamine instead of the ammonia gives the corresponding 8-methylamino, 8-ethylamino, 8-propylamino, 8-butylamino, 8-dimethylamino, or 8-dipropylamino compound.

EXAMPLE 12

8-hydroxy-3-(3-hydroxy-3-methylbutylamino)-5-methyl-as-triazino[5,6-b]indole

3 - mercapto-5-methyl-8-methoxy-as-triazino[5,6-b]indole (1.0 g.) was refluxed in 20 ml. of 48% HBr for 1¾ hours under an atmosphere of nitrogen. A yellow-orange solid was recovered (3-mercapto-5-methyl-8-hydroxy-as-triazino[5,6-b]indole); M.P. 312–314° C.

3 - mercapto - 5-methyl-8-hydroxy-as-triazino[5,6-b]indole (1.7 g.) was heated to 180° C. in 10 ml. of 4-amino-2-methyl-2-butanol for 3 hours. The title product was recovered and purified by recrystallization from acetonitrile, M.P. 218–220° C.

EXAMPLE 13

3-(3-hydroxy-3-methylbutylamino)-5-methyl-8-ntiro-as-triazino[5,6-b]indole 5 g. of 3-mercapto-5-methyl-as-triazino[5,6-b]indole was dissolved in 65 ml. of 10% sodium hydroxide and cooled in ice. To the red solution was added, dropwise with stirring, 30 ml. of 30% hydrogen peroxide. When the vigorous reaction had subsided, the yellow mixture was stirred for 50 minutes, then diluted with water and acidified with acetic acid. The yellow solid of 3-hydroxy-5-methyl-as-triazino[5,6-b]indole was filtered and recrystallized from pyridine, M.P. 345° C.

A mixture of 1.0 g. (0.005 mole) of the 3-hydroxy compound, 4.0 mls. of POCl₃, and 2.0 mls. of dimethylaniline is refluxed for 0.75 hour, cooled slightly, and carefully poured into 75–100 g. of cracked ice. The brown solid is filtered off, washed with water, dried, and recrystallized from an ample quantity of ethanol to give 3-chloro - 5 - methyl-as-triazino[5,6-b]indole, M.P. 219.5–220.5° C.

To 22 ml. of conc. H₂SO₄ cooled to 0° C. was added 1.7 g. (0.0077 m.) of 3-chloro-5-methyl-as-triazino[5,6-b]indole followed by a dropwise addition of 0.45 cc. of conc. HNO₃. The contents were stirred at 0° C. for 3½ hours and poured on 100 g. of crushed ice. The precipitated off-white solid was collected; 1.85 g. or 92.5% yield was obtained. It was recrystallized from DMF to give 3 - chloro-5-methyl-8-nitro-as-triazino[5,6-b]indole, M.P. 241°–243° C.

A mixture of 1.3 g. (0.005 m.) of 3-chloro-5-methyl-8-nitro-as-triazino[5,6-b]indole and 2.1 g. (0.02 m.) of 4-amino-2-methyl-2-butanol in 15 ml. of toluene was refluxed for 1 hour. After cooling, the yellow solid was collected and recrystallized from isopropanol-methanol mixture to give 1.2 g. of amber colored crystals (71% purified yield). M.P. was 259°–261° (dec.).

EXAMPLE 14

8 - methylmercapto-5-benzyl-3-(6-hydroxyhexylamino)-as-triazino[5,6-b]indole is prepared by acetylating p-(methylmercapto)aniline with acetic anhydride to give the acetanilide, benzylating the nitrogen atom with benzyl bromide and sodium amide, and hydrolyzing the acetyl group with NaO to give N-benzyl-p-(methylmercapto) aniline; treating this aniline with ethyl chloro-glyoxylate and then PCl₅ in a modified Stolle procedure [Ann. Chim. (Rome) 57, 492 (1967)] to give 1-benzyl-5-(methyl-mercapto)isatin; cyclization to the 3-mercaptotriazino-indole as described before; and reaction with 6-hydroxyhexylamine to give the product.

Cleavage of the 8-methylmercapto group with 48% HBr gives the 8-mercapto compound.

EXAMPLE 15

6 - nitro - 5 - methyl -3- (N-3-hydroxypropyl-N-methylamino)-as-triazino[5,6-b]indole is prepared by converting N-methyl-o-nitroaniline to 1-methyl-7-nitroisatin according to the modified Stolle procedure, cyclizing to the 3-mercaptotriazinoindole as described in previous examples, and then treating the mercaptan with N-methyl-3-hydroxypropylamine to give the product.

EXAMPLE 16

5,7-dimethyl-3-(3-hydroxy - 3 - methylbutylamino)-as-triazino[4,5-b]indole is prepared by converting N-methyl-m-toluidine to 1,6-dimethylisatin via the Sandmeyer procedure [J. Org. Chem. 21, 169 (1956)] and then converting the isatin to the 3-mercaptotriazinoindole and this to the product by means previously described. The 1,4-dimethylisatin, obtained with the 1,6-isomer, is separated from the isomer by controlling the pH of the mixture, and this isatin is then converted to the 9-methyltriazinoindole product.

EXAMPLE 17

9-methoxy-5-methyl-3-(3-hydroxy-3-methylbutylamino)-as-triazino[5,6-b]indole is prepared by converting 2-methoxy-6-nitrobenzoic acid to 2-methoxy-6-nitrophenylglyoxylic acid (by conversion to the acid chloride, reaction with KCN, and then hydrolysis); reduction of the nitro group; conversion to 4-methoxy-1-methylisatin using the Claisen-Shadwell synthesis; conversion to the 3-mercaptotriazinoindole; and then amination with 3-hydroxy-3-methylbutylamine.

Use of 3-hydroxy-2-phenylpropylamine gives 9-methoxy-5-methyl - 3 - (3-hydroxy - 2 - phenylpropylamino)-as-triazino[5,6-b]-indole.

Use of 2,3-dihydroxypropylamine gives 9-methoxy-5-methyl - 3 - (2,3 - dihydroxypropylamino) - as - triazino[5,6-b]indole.

The compounds of the invention possess antiviral activity. They are effective against vaccinia and rhinoviruses and have been found to possess favorable therapeutic ratios against rhinovirus as indicated below in the standard tube dilution test [Methods in Drug Evaluation, Mantegazza et al., ed., R. C. Stewart, p. 378 (1966)]. The therapeutic ratio is defined as the maximum concentration of compound tolerated by the cultures over the minimum concentration which inhibits cell destruction by the virus. Therapeutic ratios for particular compounds are as follows:

Compound structure

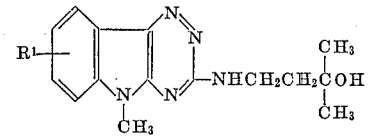

| R¹ | Therapeutic ratio against rhinovirus strain | |
|---|---|---|
| | 1059 | HGP |
| 8-OCH₃ | 100/4, 100/20 | 100/20 |
| 8-F | 100/100 | |
| 8-CH₃ | 100/20 | |
| 8-OH | 100/4 | 100/20 |
| 8-NO₂ | 100/100 | |
| 8-Br | 100/20 | |
| 8-OC₄H₉ | 100/20, 100/100 | 100/100 |
| 8-CF₃ | 100/4 | 100/20 |
| 8-NH₂ | 100/20 | |

The compounds of the invention also show activity in the standard plaque inhibition test against rhinovirus strains 1059, HGP, 2060, and 33342.

The compounds of the invention may be formulated for use in a manner well known to pharmaceutical chemists by combining them with standard pharmaceutical excipients to form tablets, capsules, ointments and intranasal preparations. The oral formulations may contain between 1 mg. and 1 g. and may be administered 1–4 times daily.

Capsules.—300 kg. of 3 - (3 - hydroxy - 3 - methylbutylamino)-8-amino-5 - methyl-as-triazino[5,6-b]indole are finely divided in a comminuting mill to produce a 60 B.S. mesh powder. This powder is filled into No. 1 hard gelatin capsules so that each capsule contains 300 mg. of the active ingredient.

EXAMPLE 18

8-chloro-3-(3-hydroxy-3-methyl butylamino)-5-methyl-as triazino(5,6-b)indole.

A mixture of 3.0 g. of 8-chloro-3-mercapto-5-methyl-as triazino(5,6-b)indole and 37 g. of 4-amino-2-methyl-2-butanol were stirred at 170–180° for 6 hours with evolution of hydrogen sulphide. The reaction mixture was cooled slowly overnight and the solid was broken up under 30 mls. of water. The solid was filtered off, washed with 30 mls. of water, and dried at 70° C. under vacuum.

Recrystallization from isopropanol gave the product as pale yellow needles M.P. 222–3° C.

3-(3-hydroxy-3-methylbutylamino)-5,8-dimethyl-as-triazino-(5,6-b)indole.

5-methylisatin was prepared in about 90° yield by the Sandmeyer isonitroso-acetanilide method, according to the procedure of Marvel and Hiers (Org. Synth. Coll., vol. 1, p. 327).

A mixture of 31.3 g. of crude 5-methylisatin, 20 g. of thiosemicarbazide, 42 g. of anhydrous potassium carbonate and water (1000 ml.) was stirred and refluxed for 7 hours. After 2½ hours at reflux a clear dark-brown solution was obtained. On cooling, the solution was acidified with acetic acid and the precipitated solid filtered off, washed with water and dried in air, and finally at 80° C. in vacuo.

34.0 g. of the 3-mercapto-5-methyl-as-triazino (5,6-b)

indole (81% of theory) was obtained as an orange solid, M.P. 350° C.

20 ml. of methyl iodide was added all at once to a stirred solution of 54 g. of the 3-mercapto compound in 580 ml. of dilute sodium hydroxide (IN). The product began to separate within one minute and the mixture became warm. It was set aside for 30 minutes. The solid was filtered off, washed thoroughly with water and dried. The product (40.0 g., 69.6%) was a greenish solid, M.P. 311–312° C. (decomp.).

Recrystallization of a small sample from dimethylformamide and finally from a mixture of ethanol and dimethylformamide gave 8-methyl-3-methylmercapto-as-triazino (5,6-b)indole as yellow rosettes, M.P. 326–326.5° C. (decomp.).

4.8 g. of sodium hydride (50% dispersion in oil) was added to a suspension of 25 g. of the 3-methylmercapto compound in 170 ml. of dimethylformamide and the mixture was stirred for 15 minutes, 7.5 ml. of methyl iodide was added all at once to the resulting orange brown solution, with vigorous stirring. A solid began to separate within one minute, the mixture becoming warm. This mixture was set aside for 20 minutes and cooled. 10 ml. of ethanol was added and the solid filtered off and washed with ethanol. It was made into a slurry with water and the undissolved solid filtered off, washed with water and dried to give 20.3 g. of the product (83.2%) as a greenish-blue solid, M.P. 191–192° C.

Two recrystallizations of a small sample from ethanol and dimethylformamide gave the product as pale-green needles, M.P. 195–196°.

A mixture of 24.4 g. of 5,8-dimethyl-3-methylmercapto-as-triazino(5,6-b)indole and 31 g. of 4-amino-3-methyl-2-butanol was stirred and heated at 180–190° (bath temp.) for 18 hours, methanethiol being evolved. (T.L.C. then indicated the absence of the S-methyl compound.) On cooling, the semi-solid mixture was stirred with 100 ml. of cold ethanol and the undissolved solid was filtered off, washed with a little ethanol and dried at 70° C. in vacuo. The product (25.75 g., 86%) had M.P. 205.5–207.5° C.

A small sample was twice recrystallized from isopropanol to give the title compound as pale cream needles, M.P. 206.5–207° C.

Tablets.—3.00 kg. of 3 - (3 - hydroxy-3-methylbutylamino) - 8 - methoxy - 5-methyl-as-triazino[5,6-b]indole, 300 g. of maize starch, 400 g. of lactose and 80 g. of hydrolyzed gelatin are mixed together, then sufficient distilled water is added to produce a damp cohesive mass. The mass is passed through a 16 B.S. mesh screen to produce granules which are dried and then passed through a screen to produce 20 B.S. mesh granules. The dried granules are mixed with 300 g. of maize starch, 800 g. of microcrystalline cellulose, 60 g. of polyethylene glycol 4000 and 60 g. of magnesium stearate. The lubricated granules are compressed on a suitable tabletting machine to produce tablets each weighing 500 mg. and containing 300 mg. of 3-(3-hydroxy-3-methylbutylamino) - 8 - methoxy-5-methyl-as-triazino[5,6-b]indole.

Nasal suspension.—100 g. of sodium carboxymethylcellulose of medium viscosity grade are dissolved in 5 liters of distilled water. When solution is complete, 20 g. of sodium citrate, 13 g. of potassium biphthalate, 0.1 g. of thiomersal and 2 ml. of eucalyptol are added. The mixture is stirred until solution takes place. 500 g. of 3-(3-hydroxy-3-methylbutylamino) - 8-hydroxy - 5 - methyl-as-triazino[5,6-b]indole are slowly dispersed in the gel, and the volume is made up to 10 liters with distilled water.

We claim:
1. A compound of the formula

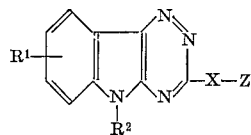

wherein:
$R^1$ is halogen, alkyl of 1–4 carbon atoms, hydroxy, mercapto, alkoxy of 1–4 carbon atoms, alkylmercapto of 1–4 carbon atoms, nitro, amino, alkylamino of 1–4 carbon atoms, dialkylamino of 2–8 carbon atoms, or trifluoromethyl;
$R^2$ is hydrogen, lower alkyl of 1–4 carbon atoms, benzyl, or phenethyl;
X is $NR^3$, where $R^3$ is hydrogen, methyl, or alkanoyl of 1–4 carbon atoms; and
Z is AlkOH, where Alk is straight or branched chain alkylene of 2–10 carbon atoms,
or a pharmaceutically acceptable acid addition salt thereof.

2. A compound as claimed in claim 1, in which XZ is

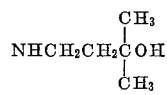

3. A compound as claimed in claim 1, in which $R^1$ is at the 8-position.

4. A compound as claimed in claim 3, in which XZ is

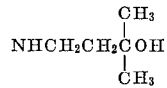

5. A compound as claimed in claim 4, which is 3-(3-hydroxy - 3 - methylbutylamino)-5-methyl - 8 - amino-as-triazino[5,6-b] indole.

6. A compound as claimed in claim 4, which is 3-(3-hydroxy - 3 - methylbutylamino) - 5 - methyl-8-trifluoromethyl-as-triazino[5,6-b] indole.

7. A compound as claimed in claim 4, which is 3-(3-hydroxy - 3 - methylbutylamino) - 5 - methyl-8-methoxy-as-triazino[5,6-b] indole.

8. A compound as claimed in claim 4, which is 3-(3-hydroxy - 3 - methylbutylamino) - 5 - methyl-8-hydroxy-as-triazino[5,6-b] indole.

9. A compound as claimed in claim 4, which is 3-(3-hydroxy - 3 - methylbutylamino) - 5 - methyl-8-butoxy-as-triazino[5,6-b] indole.

10. A compound as claimed in claim 4, which is 3-(3-hydroxy - 3 - methylbutylamino) - 5 - methyl-8-bromo-as-triazino[5,6-b] indole.

References Cited

FOREIGN PATENTS 6410823  3/1965  Netherlands.

OTHER REFERENCES

King et al., J. Chem. Soc., pp. 2314–8 (1948), QD 1. C6.

HENRY R. JILES, Primary Examiner

J. M. FORD, Assistant Examiner

U.S. Cl. X.R.

260—249.5, 325; 424—249